June 16, 1953    W. W. GARY, JR    2,642,469
ALKALINE BATTERY
Filed Oct. 30, 1950
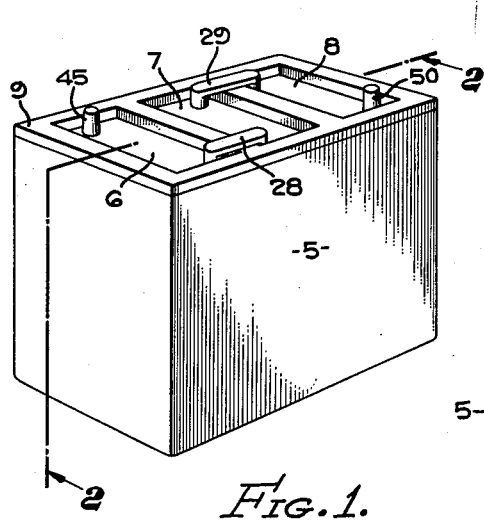
FIG.1.
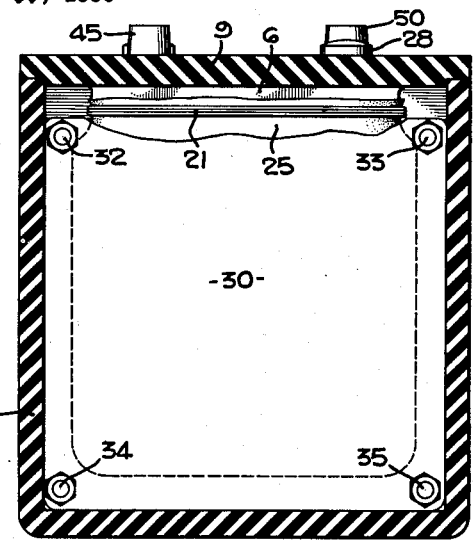
FIG.4.
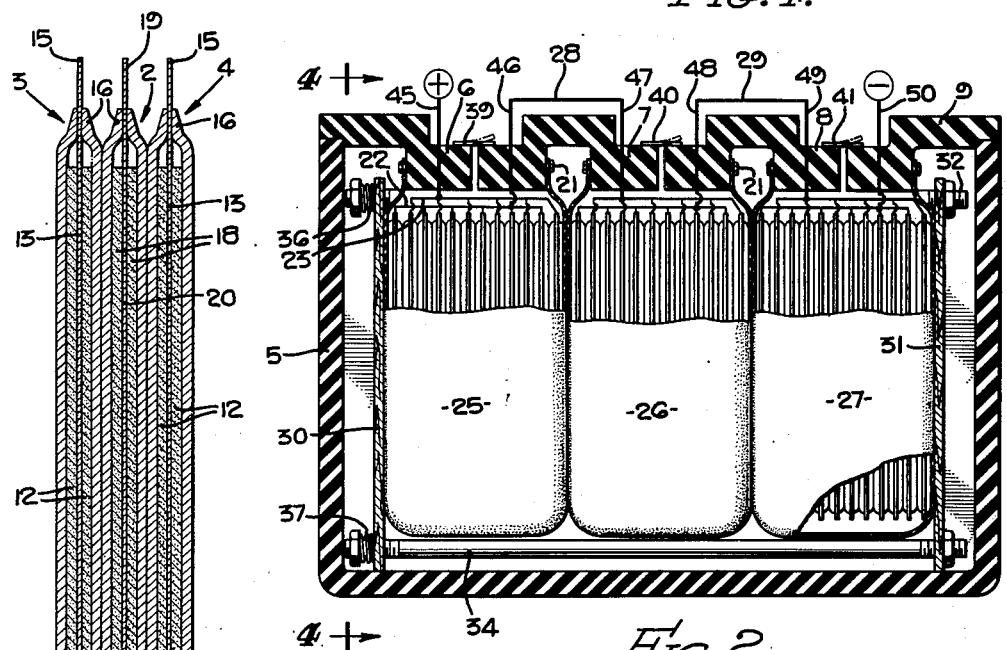
FIG.3.   FIG.2.
WRIGHT W. GARY, JR.
INVENTOR.
BY 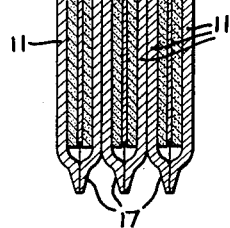
ATTORNEY Patented June 16, 1953

2,642,469

UNITED STATES PATENT OFFICE 2,642,469

ALKALINE BATTERY

Wright W. Gary, Jr., Pasadena, Calif.

Application October 30, 1950, Serial No. 192,873

9 Claims. (Cl. 136—28)

This invention relates to storage batteries, and particularly to storage batteries of the alkaline type.

Nickel cadmium alkaline storage batteries are known. This type of battery has many advantages over the lead-acid type of battery, such as long life, low operating cost, economy in maintenance, no sulfation, low rate of self discharge, sturdy and reliable, high capacity at high discharge rates, no buckling of plates, no noxious fumes, no gassing on discharge, and low water consumption. However, prior types of nickel cadmium batteries required large and heavy units in order to obtain the required amperage output for use in starting motors and the like. To obtain batteries suitable for starting purposes with this required output, thin plates of the order of one to two millimeters thick, spaced less than one millimeter apart are necessary. To build such batteries, construction costs are excessive, because of the low conductivity of the electrolyte and the active chemicals. Another of its disadvantages is in the sloughing of the active chemicals. Also, many alkaline type batteries failed because of the bursting of the positive plate due to the expansion of the nickel hydroxide, which may expand as much as thirty-five percent over its original volume.

The battery of my construction overcomes these disadvantages and provides an economical, rugged, and high ampere voltage alkaline battery. For instance, the porosity of the external membrane preserves all chemicals within the plate, while the chemical is applied in a thin sheet in contact with a continuous conductor. The maximum relation of chemical volume and weight to cell electrolyte is obtained, while the plates are nested without spacers to eliminate individual plate movement causing erosion in use and preventing splashing of free electrolyte. The plates are so nested that each cell has a maximum rigidity, pressure being exerted on the complete plate surfaces. By a large number of plates, effervescing of the cell is reduced to a minimum along with current loss due to the internal resistance.

The principal object of the invention, therefore, is to provide an improved alkaline type of storage battery.

Another object of the invention is to provide an alkaline type battery capable of having a higher discharge rate with a minimum of weight and cost relative to available ampere hours.

A further object of the invention is to produce an alkaline type storage battery having a high ratio between active chemical and structural requirements.

Although the novel features which are believed to be characteristic of this invention will be pointed out with particularity in the appended claims, the manner of its organization and the mode of its operation will be better understood by referring to the following description, read in conjunction with the accompanying drawings, forming a part thereof, in which:

Fig. 1 is a perspective view of a battery constructed in accordance with my invention.

Fig. 2 is a cross-sectional view taken along the line 2—2 of Fig. 1.

Fig. 3 is a detailed view of the plate construction, and

Fig. 4 is an end view taken along the line 4—4 of Fig. 2.

Referring now to the drawings, in which the same numerals identify like elements, the battery shown has an outer, rectangular case 5 having extended bosses 6, 7, and 8 in the top 9 thereof. The battery shown in the figures is one having only three cells, but it is to be understood that any number of cells may be added utilizing the same construction to be described hereinafter. Since each cell provides approximately 1.2 volts, a three-cell battery would provide 3.6 volts, while a five-cell battery would provide six volts.

Referring now to Figs. 2, 3, and 4, each negative and positive plate is constructed of porous backing membranes 11, these membranes being made of such material as filter paper, parchment, or suitable woven cotton or plastic fabric, or other such material which is non-reactive with the electrolyte. The thickness may be that of usual bond paper. In Fig. 3, one negative plate 2 has on each side thereof a positive plate, as shown at 3 and 4. Sprayed or painted on one surface of each of the membranes 11 of positive plates 3 and 4, is a coating of nickel-hydroxide hydrogel 12, between which is a nickel foil conductor grid 13, which may be etched, grilled, and/or corrugated to provide a greater initial bond between the foil and hydrogel and to increase the surface area therebetween. Thus, two backing membranes 11, each with a layer of nickel hydroxide hydrogel 12, and the foil 13 between the layers of hydrogel, provide one positive plate. The hydrogel does not extend to the external edges of the membrane. All contacting peripheral edges of the membranes of each plate are sealed together as indicated at 16 and 17, the membranes being sealed around a lead as shown at 15 extending from the membranes. By sealing the edges of the membranes, a porous envelope is provided so that the active chemical will be retained within the envelope without spalling or sloughing.

To form the negative plate, two similar porous membrane backings 11 are used, on which is sprayed or painted finely divided electrolytically active cadmium, such as cadmium oxide 18. This cadmium oxide has mixed with it finely divided iron oxide to prevent caking of the cadmium oxide to increase its chemical activity. Between the cadmium oxide-iron oxide layers 18, is another nickel foil conductor grid 20, this unit forming the negative plate 2. Again, the edges of the membranes are sealed at 16 and 17 to contain the chemicals within the porous membrane envelope so formed, a lead 19 extending from the grid 20 around which the membranes are sealed. The outer surfaces of the membranes of each plate have their backs in contact.

After the necessary number of these plates are arranged side by side, as shown in Fig. 2, to provide a cell of the desired ampere hour output, the plates are enclosed within an electrolyte leak-proof sack or bag 25, other cells being enclosed in similar sacks, such as at 26 and 27. These sacks may be of material such as neoprene rubber, or suitable plastics, the open ends of the bags being attached to the inner edges of the bosses 6, 7, and 8 of the cover 9, respectively, in any suitable manner, as by bindings 21. The plates are immersed in an electrolyte of potassium hydroxide, and one-way vent caps over holes through bosses 6, 7, and 8, such as shown at 39, 40, and 41, are provided, thus allowing ready escape of liberated gases, but preventing ingress of atmosphere bearing carbon dioxide.

All negative foils 20 in one cell are connected together by connecting their respective leads 19 to a bus bar, such as shown at 22 in cell 25, and all positive foils 13 of each plate in one cell are connected together by connecting their respective leads 15 to a bus bar, such as shown at 23 in cell 25. The bus bar 23 is connected to terminal 45, and bus bar 22 is connected to terminal 46. Similar bus bars in the other cells are connected to respective terminals 47 to 50, inclusive. The negative and positive terminals are then connected to each other by straps 28 and 29, as shown in Figs. 1 and 2.

After each cell is completed, it may be arranged as shown in Fig. 2, after which pressure plates 30 and 31 may be applied and a plurality of bolts or rods 32, 33, 34, and 35 employed to hold the plates in position. There are springs on each bolt to apply a predetermined pressure on the battery pile, and which permit expansion and contraction of the cells, two of such springs being shown at 36 and 37. Instead of having the pressure rods 32 to 35, inclusive, pass through the plates, as shown in U.S. Patent No. 1,379,088 of March 24, 1921, the rods are external of the plates. By not having rods through the plates, the transfer of the chemicals from one plate to another is prevented during expansion and contraction of the cells caused by the charging and discharging of the battery. Furthermore, it will be noted that each plate is an individual unit in which the chemical is contained, while each cell is a separate unit in which the electrolyte is contained. The plurality of bolts 32 to 35, inclusive, therefore, are not immersed in the electrolyte, nor are they in contact with any chemicals.

One of the features of the battery is the nickel hydroxide hydrogel used in forming the positive plate. I prepare this hydrogel by slowly adding an aqueous solution of sodium or potassium hydroxide to a dilute, agitated, boiling, aqueous solution of a nickel salt, such as the sulfate, and continue the reaction slightly past stoichiometric requirements. Prior to the formation of the nickel hydroxide, graphite, nickel flakes, or other non-reactive conductors may be mixed with the nickel salt solution. These conductors provide a nucleus around which the freshly precipitated hydrogel is formed. To prevent possible cracking of the hydrogel and to increase its strength when in very thin layers, an inert filler material may also be added, such materials being paper pulp fibre, cotton, asbestos, or the like.

The hydrogel is then filtered to remove any excess solution and washed to remove sulfates, carbonates, and other soluble salts, and pressed at sufficient pressure to squeeze an amount of water from the hydrogel sufficient to promote a plastic mass of the consistency of molding clay. Drying is carefully avoided so as not to destroy the hydrogel structure. This active chemical is then applied to the backing membranes 11, as shown at 12, and in the manner described above.

By having the unimpregnated sides of the membranes 11 facing outwardly, they are free from the chemicals and are non-conductive, which permits their being nested with other plates of opposite polarity. The membranes also allow the escape of any gasses which might be liberated, which prevents gas or vapor binding that might otherwise exist in the cell. The hydrogel has adhesive characteristics, which cause it to adhere to the membrane backing 11 and also to the conductive foil grids 13, the pressure applied by bolts 32 to 35, inclusive, insuring maximum conductor-chemical contact and minimum plate volume. By sealing the hydrogel within the membranes, creepage thereof, over extended use, through expansion and contraction, is prevented.

After the battery is assembled, as described above, it should be charged first at a high rate of charge for a short period of time, and then at a low rate. During the high rate of charge, the concentration of the potassium hydroxide electrolyte should be under one percent or less than 1.008 specific gravity. By this high rate of charge, a higher molecular bond between the active chemical and the foil conductor grid is achieved, as well as producing a very dense, active chemical and etching of the foil. In the second charging step, the electrolyte concentration is increased to 25-27 percent or 1.239-1.270 specific gravity.

I claim:

1. A battery cell construction of the alkaline type comprising a plurality of interposed positive and negative plates, said positive plates including an individually sealed envelope of porous membrane, thin layers of nickel hydroxide hydrogel in a soft plastic mass covering substantially the entire internal surface of said membrane, a foil conductor between said hydrogel layers and extending externally of said envelope, said negative plates being interposed between said positive plates and including an individually sealed envelope of porous membrane, thin layers of cadmium oxide covering substantially the entire internal surface of said membrane, and a thin foil between said cadmium oxide layers and extending externally of said envelope, the outer surfaces of said membranes of said positive plates being in contact with the outer surfaces of said negative plates.

2. A battery cell construction in accordance with claim 1, in which said cadmium oxide layers have mixed therein finely divided iron oxide, and said plates are enclosed in a non-porous flexible sack filled with potassium hydroxide.

3. A battery cell construction in accordance with claim 1, in which is provided a non-porous flexible sack for said plates, backing members at the end surfaces of the end sacks, and tensioning bolts between said members at the edges of said sacks and external thereto.

4. An alkaline battery comprising a casing, a plurality of cells in said casing, each of said cells comprising a plurality of interposed positive plates and negative plates, each of said positive plates including an individual envelope of parallel membranes, thin layers of nickel hydroxide hydrogel coating substantially the entire interior surfaces of said membranes, a conductor foil between said hydrogen layers, said membranes being sealed at the edges thereof to form said envelope, and each of said negative plates including an individual envelope of a pair of parallel membranes, thin layers of a combination of cadmium and iron oxides coating substantially the entire interior surfaces of said second pair of membranes, a conductor foil between said cadmium layers, said membranes being sealed at the edges thereof to form said envelope, the outer surfaces of the membranes of said negative plates physically contacting the outer surfaces of the membranes of said positive plates, a non-porous flexible sack enclosing all the plates of each cell, an electrolyte of potassium hydroxide in each sack and immersing said plates, pressure members along the outer surfaces of the end cells, a plurality of bolts joining said members at the edges of said cells and externally thereof, and tensioning means on said bolts for permitting said end members to move toward and away from one another during expansion and contraction of said cells.

5. An alkaline battery cell construction, comprising two spaced porous membranes in parallel planes, thin coatings of nickel hydroxide hydrogel in a soft plastic mass on the opposing surfaces of said membranes, said coatings extending over substantially the entire opposing surfaces of said membranes, a thin conducting grid foil between and in contact with said coatings, said membranes being sealed around the peripheral edges thereof and said foil extending beyond the edges of said membranes at one point, said above mentioned construction forming a positive plate of said cell, two additional, spaced porous membranes in planes parallel to said first mentioned membranes, thin coatings of a combination of cadmium and iron oxides on the opposing surfaces of said last mentioned membranes, said coatings extending over substantially the entire opposing surfaces of said last mentioned membranes, and a thin conductor grid foil between and in contact with said last mentioned coatings, said last mentioned membranes being sealed around the peripheral edges thereof, and said foil extending beyond the edges of said membranes at one point, said last mentioned construction forming a negative plate of said cell, the opposing external surfaces of said membranes of said respective plates being in contact with one another.

6. The method of preparing a nickel hydroxide hydrogel for an alkaline battery, comprising first mixing graphite flakes with a dilute, aqueus, boiling solution of a nickel salt, secondly, slowly mixing an aqueous solution of sodium hydroxide to said dilute, aqueous solution of the nickel salt, agitating said solution during mixing, thirdly, filtering the resulting precipitate of nickel hydroxide hydrogel to remove excess solution, fourthly, washing the precipitate to remove soluble salts therefrom, and then applying pressure to said precipitate to form a plastic mass of hydrogel of the consistency of molding clay.

7. The method of claim 6, in which an inert filler is mixed with said solution of nickel salt before the adding of said sodium hydroxide.

8. A homogeneous active material for an alkaline storage battery electrode having a plastic mass of the consistency of molding clay formed by slowly adding a concentrated solution of sodium hydroxide to a dilute aqueous boiling solution of a nickel salt in which a conductive material has been previously mixed, said solution being agitated during mixing and precipitation, said precipitate being washed to remove soluble salts therefrom.

9. A homogeneous active material in accordance with claim 8, in which an inert fibrous filler is mixed with said nickel salt before the addition of said sodium hydroxide.

WRIGHT W. GARY, Jr.

References Cited in the file of this patent

UNITED STATES PATENTS

| Number | Name | Date |
| --- | --- | --- |
| 309,939 | Faure | Dec. 30, 1884 |
| 914,372 | Edison | Mar. 2, 1909 |
| 1,083,356 | Edison | Jan. 6, 1914 |
| 1,104,898 | Hubble | July 28, 1914 |
| 1,167,484 | Edison | Jan. 11, 1916 |
| 1,366,223 | Wales | Jan. 18, 1921 |
| 1,377,194 | Edison | May 10, 1921 |
| 1,379,088 | Edison | May 24, 1921 |
| 1,649,579 | Edison | Nov. 15, 1927 |
| 1,740,518 | Miller | Dec. 24, 1929 |
| 1,884,166 | Otsuka et al. | Oct. 25, 1932 |
| 1,879,904 | Kranzlein et al. | Sept. 27, 1932 |
| 2,157,629 | Rolph | May 9, 1939 |
| 2,184,373 | Adams | Dec. 26, 1939 |
| 2,213,128 | Langguth | Aug. 27, 1940 |

FOREIGN PATENTS

| Number | Country | Date |
| --- | --- | --- |
| 390,122 | Great Britain | 1933 |